United States Patent [19]

Goings

[11] 3,860,262
[45] Jan. 14, 1975

[54] SIDE SPLASH GUARD FOR TRAILER TRUCKS AND WHEELS OF A ROAD VEHICLE

[76] Inventor: Harford E. Goings, P. O. Box 64, Manassas, Va. 22110

[22] Filed: Oct. 24, 1973

[21] Appl. No.: 409,146

[52] U.S. Cl. ............................................... 280/154.5 R
[51] Int. Cl. ............................................. B62b 39/00
[58] Field of Search ................. 280/154.5 R, 153 R

[56] References Cited
UNITED STATES PATENTS
2,605,119   7/1952   Earnest ........................... 280/153 R

*Primary Examiner*—David Schonberg
*Assistant Examiner*—Michael J. Forman
*Attorney, Agent, or Firm*—Blair & Brown

[57] ABSTRACT

A side splash guard for the wheels of a road vehicle to prevent transverse splashing from the wheels from contacting vehicles in adjacent lanes and interferring with their vision. The splash guards are normally incased in housings on the side of the vehicle and consist of rigid panels which are lowered from the housing to a position closely adjacent the side of the wheels while the vehicle is moving along the highway. When tight turns are required the panels are raised upwardly into the housing so as to clear the wheels during tight turns.

The panels are moved by motors controlled by the operator of the vehicle and may be simultaneously or selectively raised and lowered.

5 Claims, 6 Drawing Figures

PATENTED JAN 14 1975  3,860,262
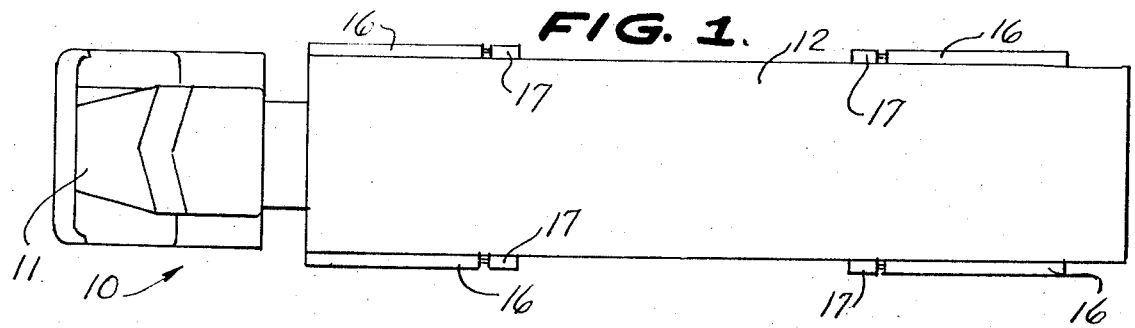
FIG. 1.
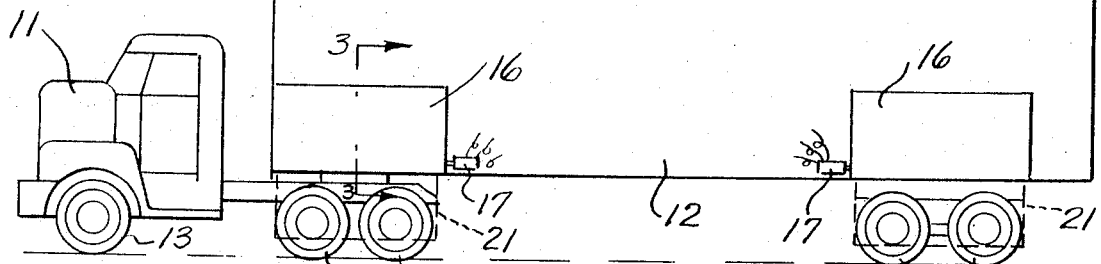
FIG. 2.
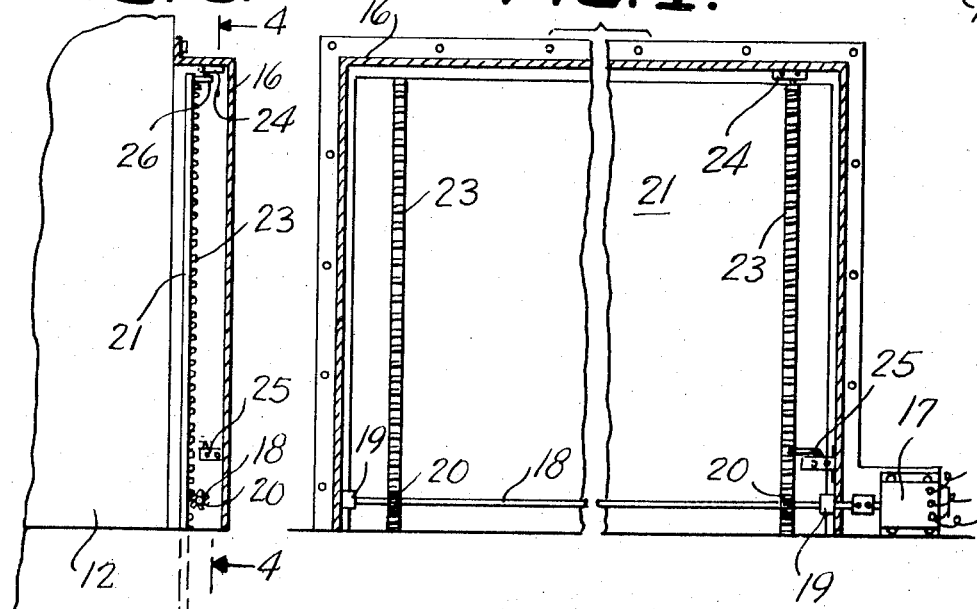
FIG. 3. FIG. 4.
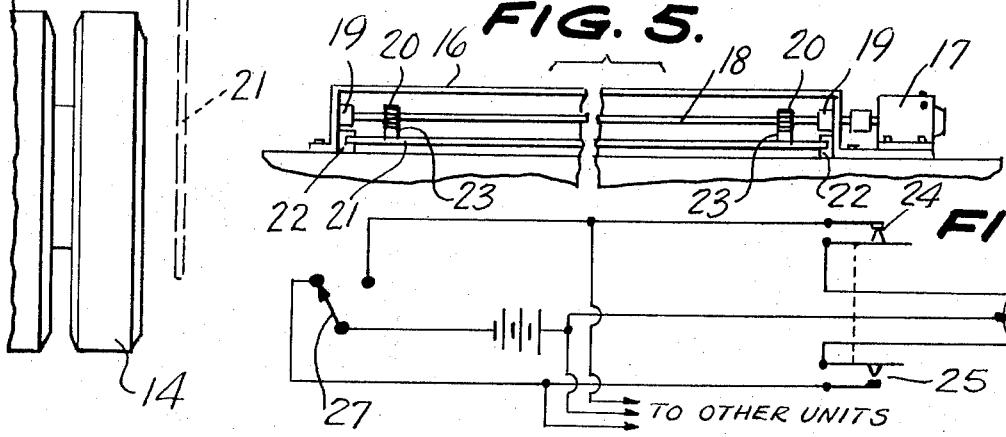
FIG. 5.
FIG. 6.

SIDE SPLASH GUARD FOR TRAILER TRUCKS AND WHEELS OF A ROAD VEHICLE

BACKGROUND OF THE INVENTION

Field of the Invention

The present invention relates to side splash guards for the wheels of a vehicle.

SUMMARY OF THE INVENTION

The side splash guards for vehicle wheels each comprise a panel which can be lowered from a housing on the side of the vehicle into a position closely adjacent the wheels of the vehicle to prevent lateral splashing from the wheels into vehicles in adjacent lanes of traffic either moving in the same or opposite directions. The panels are motor driven and controlled remotely by the vehicle operator so as to be raised when rounding corners at relatively sharp angles.

The primary object of the invention is to provide remotely controlled side splash guards for vehicle wheels.

Other objects and advantages will become apparent in the following specification when considered in light of the attached drawings.

BRIEF DESCRIPTION OF THE DRAWINGS

FIG. 1 is a top plan view of the invention;

FIG. 2 is a side elevation of the invention with the lowered position of the panels shown in broken lines;

FIG. 3 is an enlarged fragmentary vertical sectional view, taken along the line 3—3 of FIG. 2, looking in the direction of the arrows;

FIG. 4 is a fragmentary vertical sectional view, taken along the line 4—4 of FIG. 3, looking in the direction of the arrows;

FIG. 5 is a fragmentary bottom plan view of the invention; and

FIG. 6 is a circuit diagram illustrating the remote control of one of the motors.

DESCRIPTION OF THE PREFERRED EMBODIMENT

Referring now to the drawings in detail, wherein like reference characters indicate like parts throughout the several figures, the reference numeral 10 indicates generally a side splash guard for vehicle wheels constructed in accordance with the invention.

A side splash guard 10 is illustrated as applied to trailer trucks of the type including a tractor unit 11 and a box trailer unit 12 coupled thereto. The tractor unit 11 is supported on front wheels 13 and dual rear wheels 14. Dual trailer support wheels 15 support the rear end of the trailer 12 all in a conventional manner. A pair of generally rectangular housings 16 open at their lower ends are secured to the trailer 12 in a position overlying the truck dual wheels 14 and spaced outwardly therefrom. An electric motor 17 is secured to the housing 16 and has an elongate shaft 18 coupled thereto and supported in spaced bearings 19. The shaft 18 has a pair of spur gears 20 mounted thereon for rotation therewith.

A rigid splash shield panel 21 is mounted in each of the housings 16 in vertically extending channels guide 22 mounted in each of the housings 16. A pair of rack bars 23 are secured to each of the panels 21 in spaced parallel vertically extending relation with the rack bars 23 meshing with the spur gears 20 so that rotation of the shaft 18 and the spur gears 20 will move the panel 21 inwardly and outwardly of the housing 16.

An upper limit switch 24 and a lower limit switch 25 are positioned in the housing 16 and a pin 26 on the panel 21 is arranged to contact the limit switches 24, 25 at the upper and lower limits of the movement of the panel 21. A hand controlled switch 27 is positioned in the cab of the truck 11 for actuation by the truck driver. The switch 27 is double acting and in one position raises the panel 21 until the limit switch 24 is opened and in the other position lowers the panel 21 until the limit switch 25 is opened. The limit switches 24, 25 are normally closed permitting the flow of electricity with either setting of the switch 27 except when the panel 21 is in its uppermost position or in its lowermost position. The switch 27 may be used to control all of the panels 21 on a tractor or a plurality of switches 27 may be provided so that each of the panels 21 may be separately actuated.

Additional housings 16 are secured to the rear of the trailer 12 and contain panels 21 operating in the identical manner to those described above.

After the trailer truck 10 has obtained normal highway speed the panels 21 may all be lowered since no sharp turns can then occur such as to cause the truck wheels 14 to come in contact with the adjacent panels 21. As the truck slows down and enters varies of relatively sharp turns the panels 21 are raised to hold them out of harms way.

While the invention is illustrated applied to trailer trucks it should be understood that any wheeled road vehicle may have the invention used therewith.

Having thus described the preferred embodiment of the invention it should be understood that numerous structural modifications and adaptations may be resorted to without departing from the spirit of the invention.

What is claimed is:

1. A side splash guard for wheels of a road vehicle comprising a housing secured to the side of the vehicle overlying and spaced outwardly from the support wheels of said vehicle, a substantially rigid panel parallel to the longitudinal axis of said vehicle and slidably mounted in said housing for vertical sliding movement into and out of the bottom of said housing, means on said housing for moving said panels into and out of said housing, and remote control means on said vehicle for controlling the means moving said panels into and out of said housing.

2. A device as claimed in claim 1 wherein the means for moving said panels into and out of said housing comprises an electric motor.

3. A device as claimed in claim 2 wherein a shaft is mounted in said housing coupled to said electric motor and means are provided on said shaft cooperating with means on said panel for moving said panel upon rotation of said electric motor.

4. A device as claimed in claim 3 wherein the means connecting said shaft and said panel comprises a pair of vertically extending rack bars secured to said panel and a pair of spur gears secured to said shaft meshing with said rack bars.

5. A device as claimed in claim 4 including upper and lower limit switches for controlling the upper and lower extent of movement of said panel and means on said panel for contacting said limit switches at the upper and lower extremity of movement of said panel.

* * * * *